United States Patent
Liu et al.

(10) Patent No.: US 9,462,094 B2
(45) Date of Patent: Oct. 4, 2016

(54) DEVICE HOUSING AND PORTABLE ELECTRONIC DEVICE USING SAME

(71) Applicants: SHENZHEN FUTAIHONG PRECISION INDUSTRY CO., LTD., Shenzhen (CN); FIH (Hong Kong) Limited, Kowloon (HK)

(72) Inventors: Xu Liu, Shenzhen (CN); Yi Yang, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 65 days.

(21) Appl. No.: 14/522,108

(22) Filed: Oct. 23, 2014

(65) Prior Publication Data
US 2015/0189049 A1    Jul. 2, 2015

(30) Foreign Application Priority Data
Dec. 31, 2013   (CN) .......................... 2013 1 0747943

(51) Int. Cl.
| | |
|---|---|
| H04M 1/00 | (2006.01) |
| H04M 1/02 | (2006.01) |
| H01Q 1/24 | (2006.01) |
| H01Q 13/10 | (2006.01) |

(52) U.S. Cl.
CPC ............. *H04M 1/026* (2013.01); *H01Q 1/243* (2013.01); *H01Q 13/10* (2013.01)

(58) Field of Classification Search
None
See application file for complete search history.

(56) References Cited

U.S. PATENT DOCUMENTS

| | | | | |
|---|---|---|---|---|
| 6,353,733 | B1* | 3/2002 | Murray | H04M 1/0216 343/702 |
| 6,430,400 | B1* | 8/2002 | MacDonald, Jr. | H01Q 1/242 455/550.1 |
| 8,369,086 | B2* | 2/2013 | Tang | G06F 1/1626 345/173 |
| 2003/0116891 | A1* | 6/2003 | Okuyama | C04B 35/49 264/620 |
| 2003/0160729 | A1* | 8/2003 | Komiyama | H01Q 1/12 343/702 |
| 2008/0070500 | A1* | 3/2008 | Rapp | H04N 5/2251 455/41.1 |
| 2009/0149229 | A1* | 6/2009 | Li | H04M 1/0237 455/575.4 |
| 2010/0130268 | A1* | 5/2010 | Huang | H01M 2/105 455/575.1 |
| 2010/0210324 | A1* | 8/2010 | Xu | E05C 19/006 455/575.1 |
| 2011/0151823 | A1* | 6/2011 | Yang | H01Q 1/2275 455/347 |
| 2012/0276856 | A1* | 11/2012 | Joshi | A61N 1/37229 455/73 |
| 2014/0301049 | A1* | 10/2014 | Wu | G06K 13/08 361/756 |

FOREIGN PATENT DOCUMENTS

TW    M1317719    8/2007

* cited by examiner

*Primary Examiner* — Dominic Rego
(74) *Attorney, Agent, or Firm* — Zhigang Ma (57) ABSTRACT

A housing for a portable electronic device is provided. The housing includes a first section made of metal and a second section made of dielectric ceramic. The second section is coupled to the first section to cooperatively define an accommodating space. When an antenna is coupled to an inner surface of the second section facing the accommodating space, the antenna can transmit and receive signals through the second section. A portable electronic device incorporating the housing is also provided.

18 Claims, 7 Drawing Sheets

DEVICE HOUSING AND PORTABLE ELECTRONIC DEVICE USING SAME

FIELD

The present disclosure relates to device housings and portable electronic devices using device housings.

BACKGROUND

Portable electronic devices usually have housings and antennas inside the housings. It is required that the housings should allow the antennas to function.

BRIEF DESCRIPTION OF THE DRAWINGS

Implementations of the present technology will now be described, by way of example only, with reference to the attached figure, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 1:
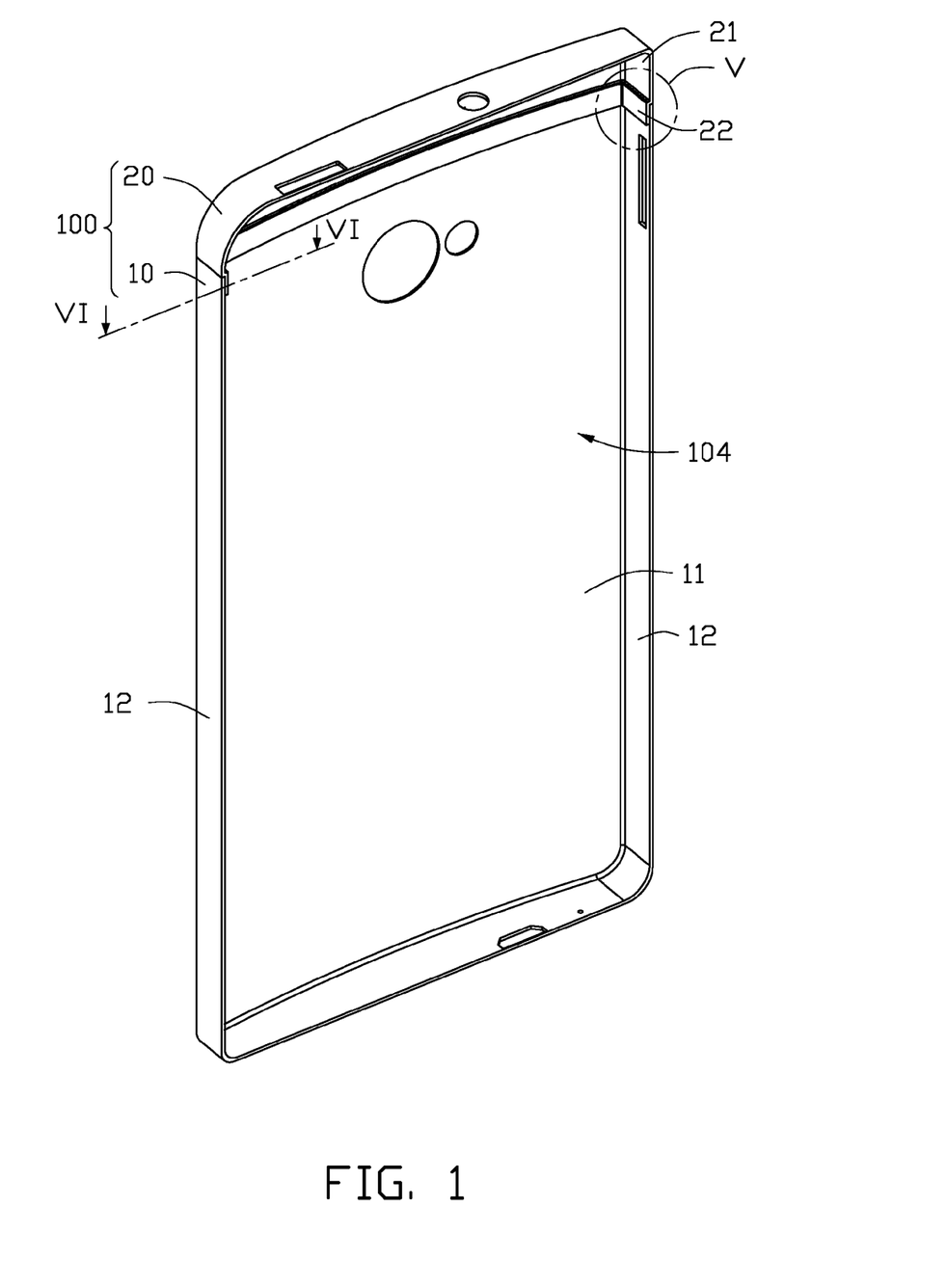
FIG. 1 is a perspective view of a housing, according to an exemplary embodiment of the disclosure.

FIG. 1 illustrates a housing 100 for portable electronic device such as mobile phones and tablet computers. In the embodiment, the housing 100 is shown as a back cover of a mobile phone. The housing 100 comprises a first section 10 substantially composed of metal and a second section 20 substantially composed of dielectric ceramic. The second section 20 is coupled to the first section 10 to cooperatively define an accommodating space 104.

In the exemplary embodiment, the first section 10 and the second section 20 are two separate parts coupled together. In other embodiments, the first section 10 and the second section 20 can be integrally formed together.

Figure 4:
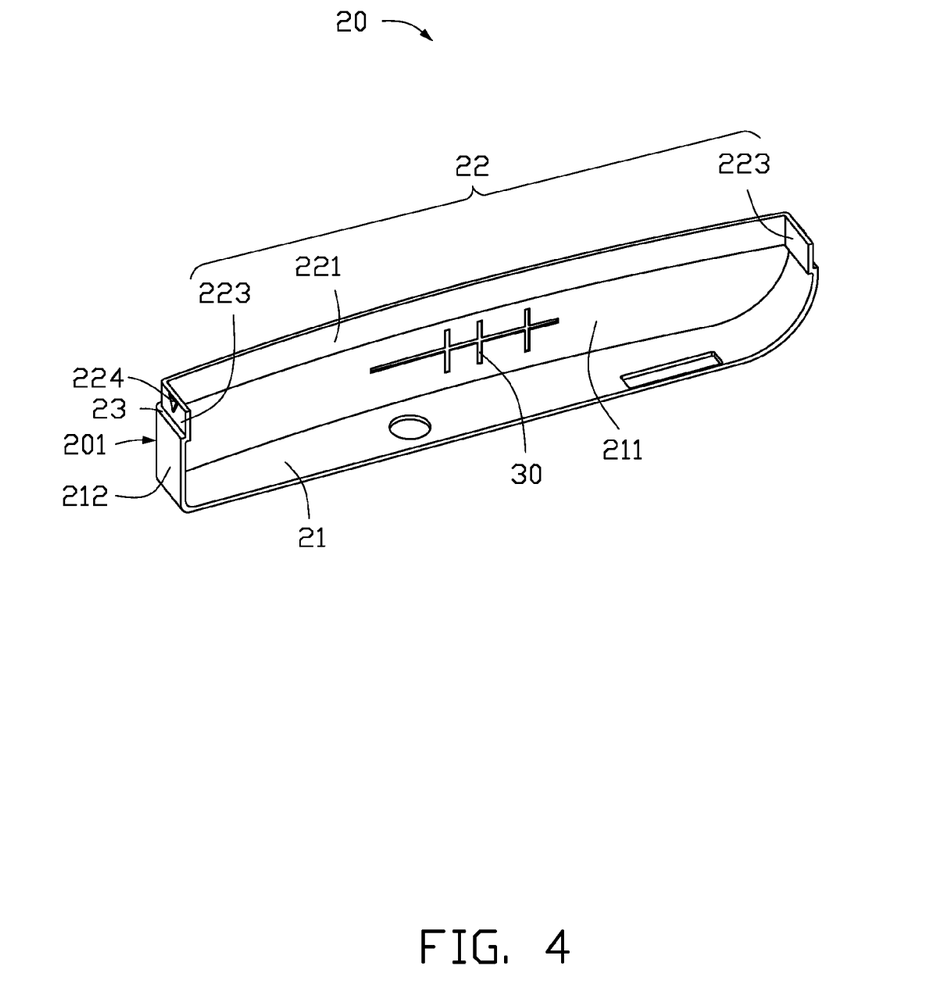
FIG. 4 is a perspective view of a second section of the housing of FIG. 3, but viewed from another angle.

FIG. 4 illustrates that the housing 100 further comprises an antenna 30 coupled to the second section 20. The second section 20 comprises a main portion 21 and a latching portion 22 extending from the main portion 21, the latching portion 22 is coupled to the first section 10. The antenna 30 is coupled to an inner surface 211 of the main portion 21 facing the accommodating space 104. The antenna 30 can be conductive material formed on the main portion 21. The conductive material can be but is not limited to conductive ink and conductive metal. The conductive material can be formed on the main portion 21 by any known feasible method for forming such a conductive material on a substrate made of dielectric ceramic. The antenna 30 can transmit and receive signals through the main portion 21 since the second section 20 is made of dielectric ceramic.

Figure 3:
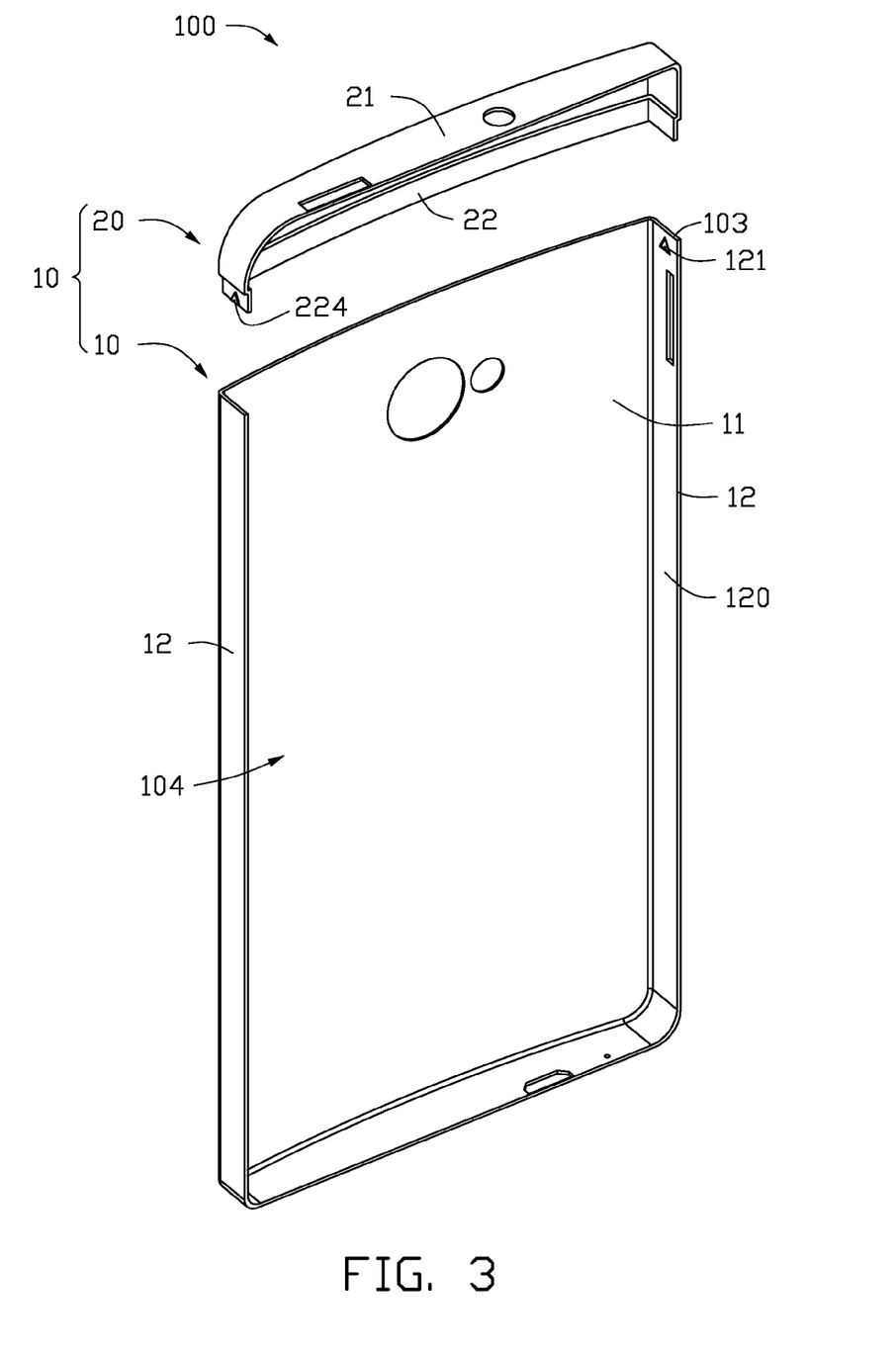
FIG. 3 is an exploded view of the housing of FIG. 1.

FIG. 3 illustrates that the first section 10 defines at least one latching recess 121 and the latching portion 22 comprises at least one latching protrusion 224. The at least one latching protrusion 224 is latched in the at least one latching recess 121 (best shown in FIG. 6). The at least one latching recess 121 and the at least one latching protrusion 224 are triangular shaped. In the exemplary embodiment, the first section 10 defines two latching recesses 121 and the latching portion 22 comprises two latching protrusions 224. The first section 10 comprises an end surface 103 of an end coupled to the second section 20.

Figure 2:
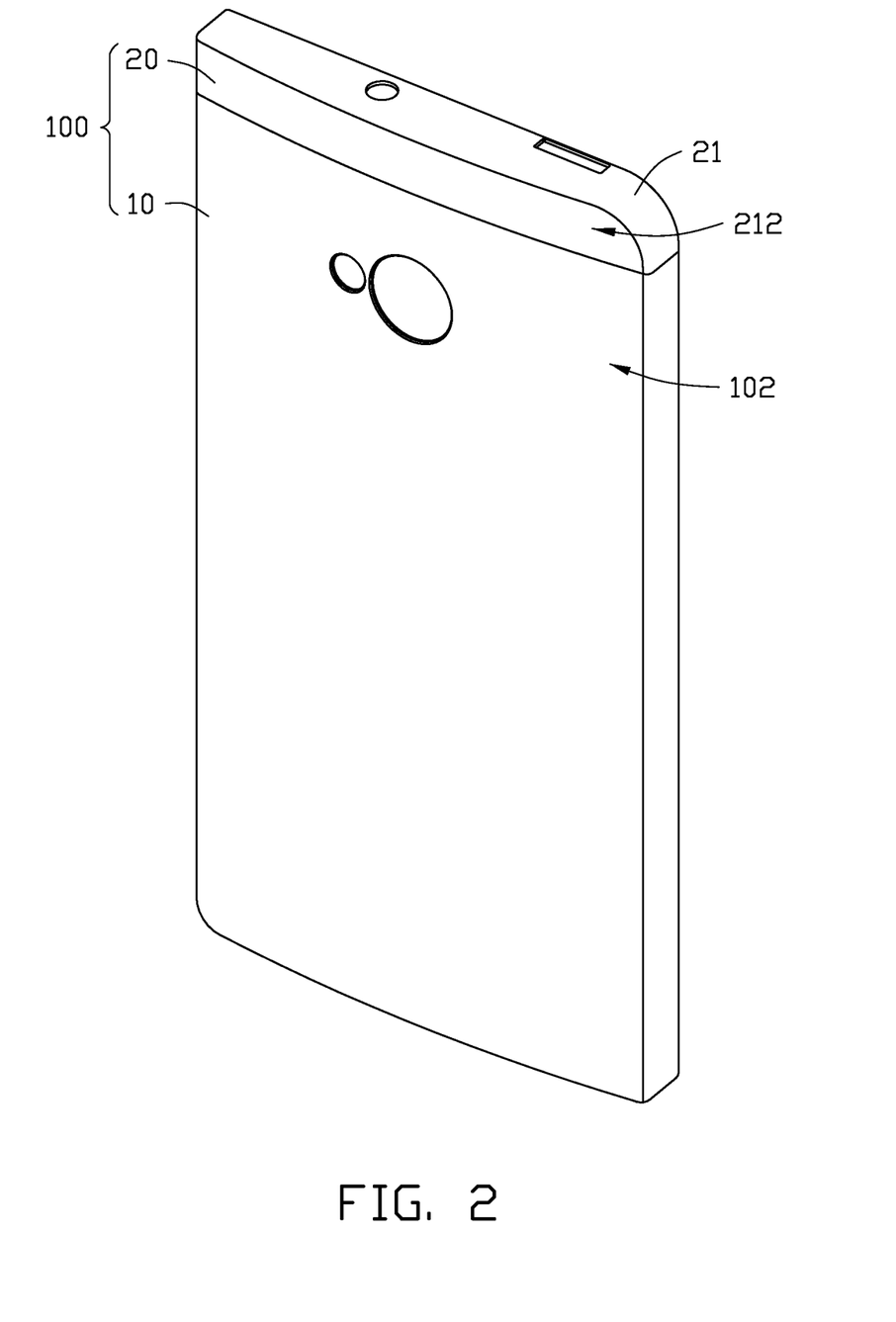
FIG. 2 is similar to FIG. 1, but viewed from another angle.
Figure 5:
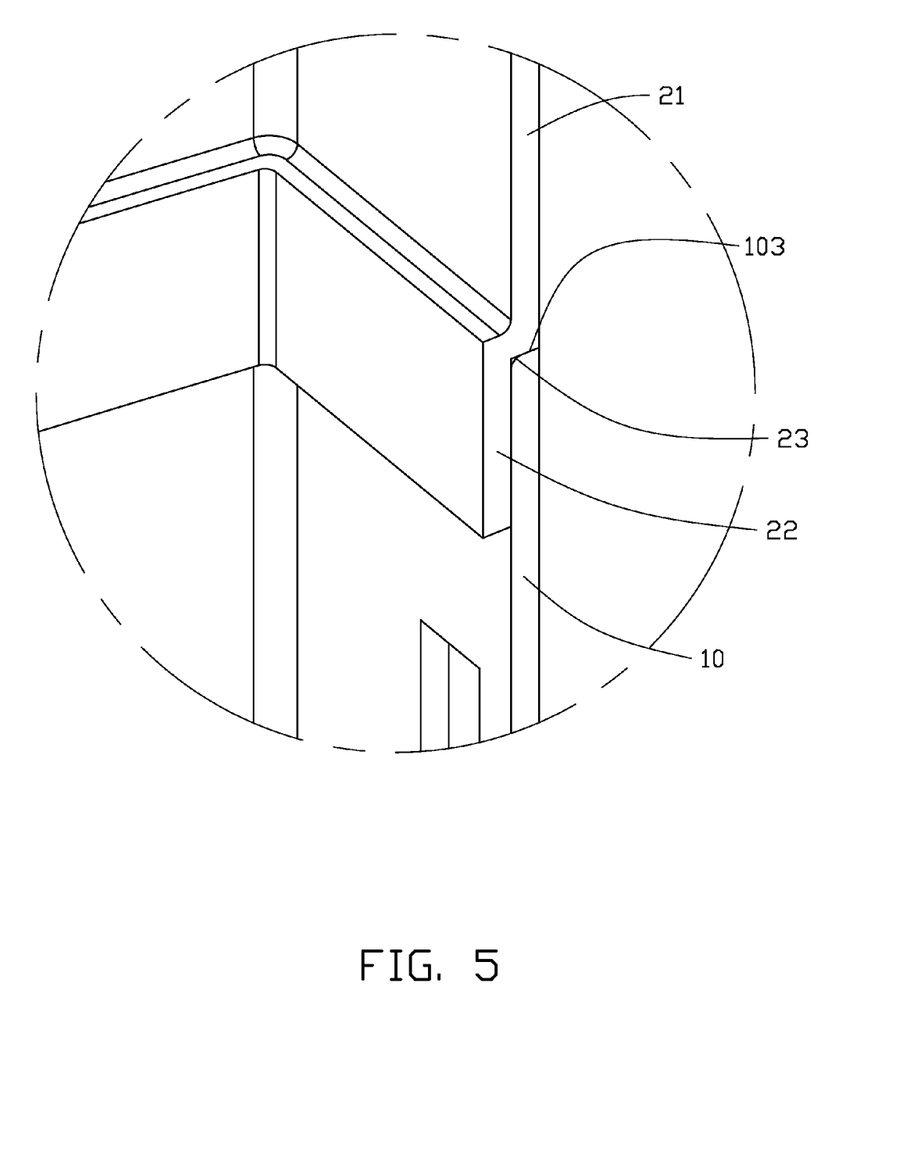
FIG. 5 is an enlarged view of circled portion V of FIG. 1.

FIG. 4 illustrates that a step portion 23 is formed at an end of the main portion 21 connected to the latching portion 22, thereby forming a stepped exterior periphery 201 of the second section 20. FIGS. 2 and 5 illustrate that the end surface 103 resists and is aligned with the step portion 23, allowing a first outer surface 212 of the main portion 21 to be coplanar with a second outer surface 102 of the second section 20.

The first section 10 further comprises a board portion 11 and two side walls 12 extending substantially perpendicularly from opposite sides of the board portion 11. The at least one latching recess 121 is defined in an internal surface 120 of at least one of the two side walls 12 facing the accommodating space 104.

Figure 6:
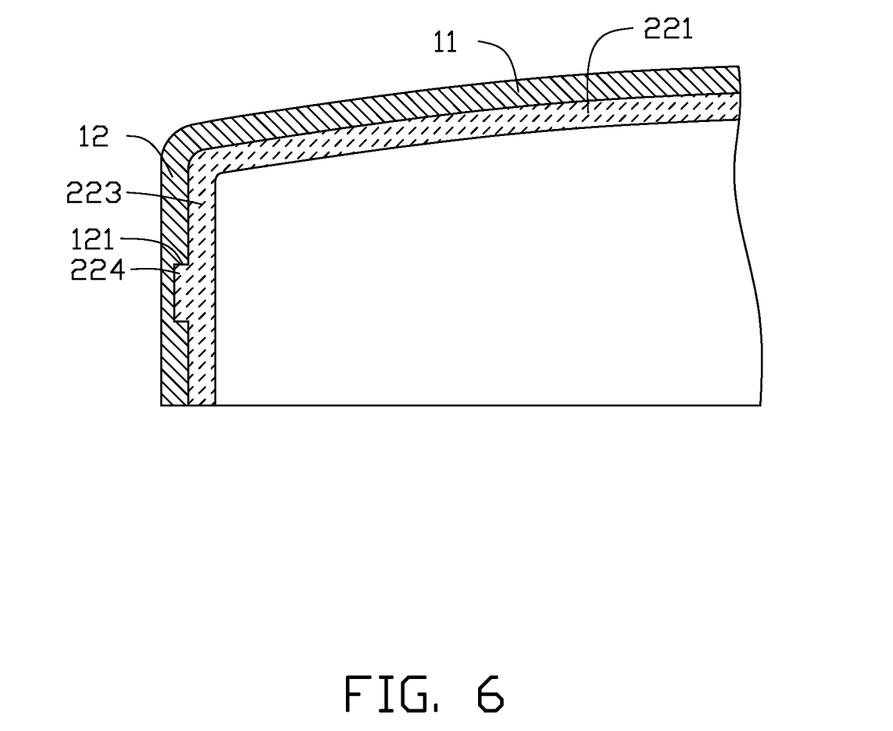
FIG. 6 is a cross-sectional view of FIG. 1 taken along line VI-VI.

FIGS. 4 and 6 illustrate that the latching portion 22 comprises a connecting portion 221 and two latching walls 223 connected to opposite ends of the connecting portion 221. The two latching walls 223 are substantially perpendicular to the connecting portion 221. The at least one latching protrusion 224 protrudes from at least one of the two latching walls 223. The latching portion 22 is received in the accommodating space 104 with the connecting portion 221 abutting the board portion 11 and the two latching walls 223 abutting the two side walls 12.

Figure 7:
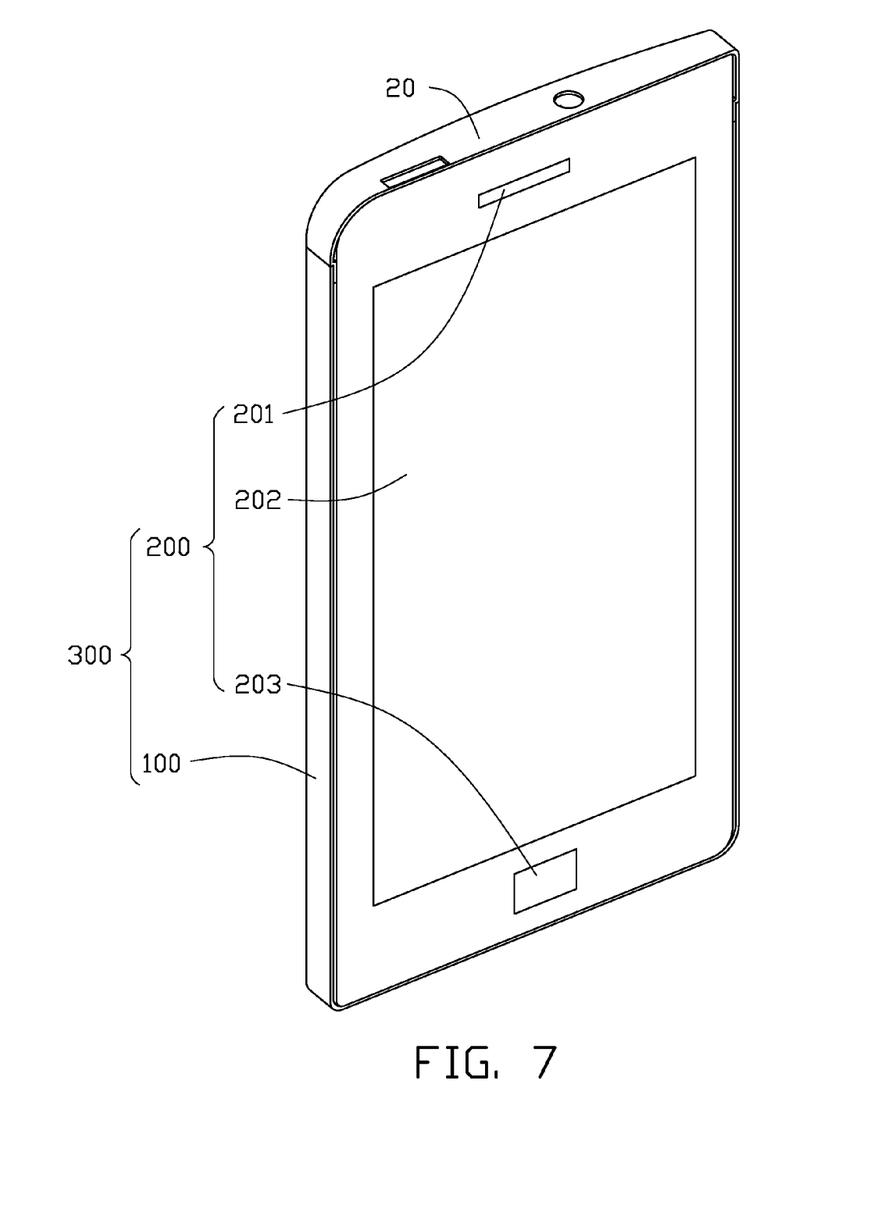
FIG. 7 is a perspective view of a portable electronic device according to an exemplary embodiment.

FIG. 7 illustrates an embodiment of a portable electronic device 300 incorporating the housing 100. The portable electronic device 300 comprises a main body 200 and the housing 100 assembled to and casing the main body 200. housing 100 comprises the first section 10, the second section 20, and the antenna 30. The main body 200 can have a plurality of components for carrying out functions of the portable electronic device 300. The antenna 30 is connectable to at least one of the components of the electronic device. The components comprise a receiver 201, an display screen 202, and buttons 203, for example.

The embodiments shown and described above are only examples. Many details are often found in the art such as the other features of a server. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A housing for a portable electronic device, comprising:
a first section made of metal; and
a second section made of dielectric ceramic, the second section is coupled to the first section to cooperatively define an accommodating space;
wherein the first section comprises an end surface of an end coupled to the second section; the second section comprises a main portion and a latching portion extending from the main portion; a step portion is formed at an end of the main portion connected to the latching portion, thereby forming a stepped exterior periphery of the second section; the end surface resists and is aligned with the step portion for allowing a first outer surface of the main portion to be flush with a second outer surface of the second section.

2. The housing of claim 1, further comprising an antenna coupled to the second section.

3. The housing of claim 2, wherein the latching portion is coupled to the first section; the antenna is coupled to an inner surface of the main portion facing the accommodating space.

4. The housing of claim 3, wherein the first section defines at least one latching recess; the latching portion comprises at least one latching protrusion; the at least one latching protrusion is latched in the at least one latching recess.

5. The housing of claim 4, wherein the at least one latching recess and the at least one latching protrusion are triangular shaped.

6. The housing of claim 4, wherein the first section comprises a board portion and two side walls extending substantially perpendicularly from opposite sides of the board portion; the at least one latching recess is defined in an internal surface of at least one of the two side walls facing the accommodating space.

7. The housing of claim 6, wherein the latching portion comprises a connecting portion and two latching walls connected to opposite ends of the connecting portion, the two latching walls are substantially perpendicular to the connecting portion; the at least one latching protrusion protrudes from at least one of the two latching walls.

8. The housing of claim 7, wherein the latching portion is received in the accommodating space with the connecting portion abutting the board portion and the two latching walls abutting the two side walls.

9. A portable electronic device, comprising:
a main body; and
a housing assembled to and casing the main body, the housing comprising:
a first section made of metal; and
a second section made of dielectric ceramic, the second section is coupled to the first section to cooperatively define an accommodating space;
wherein the first section comprises an end surface of an end coupled to the second section; the second section comprises a main portion and a latching portion extending from the main portion; a step portion is formed at an end of the main portion connected to the latching portion, thereby forming a stepped exterior periphery of the second section; the end surface resists and is aligned with the step portion for allowing a first outer surface of the main portion to be flush with a second outer surface of the second section.

10. The portable electronic device of claim 9, further comprising an antenna coupled to the second section.

11. The portable electronic device of claim 10, wherein the latching portion is coupled to the first section; the antenna is coupled to a surface of the main portion facing the accommodating space.

12. The portable electronic device of claim 11, wherein the first section defines at least one latching recess; the latching portion comprises at least one latching protrusion; the at least one latching protrusion is latched in the at least one latching recess.

13. The portable electronic device of claim 12, wherein the at least one latching recess and the at least one latching protrusion are triangular shaped.

14. The portable electronic device of claim 12, wherein the first section comprises a board portion and two side walls extending substantially perpendicularly from opposite sides of the board portion; the at least one latching recess is defined in an internal surface of at least one of the two side walls facing the accommodating space.

15. The portable electronic device of claim 14, wherein the latching portion comprises a connecting portion and two latching walls connected to opposite ends of the connecting portion, the two latching walls are substantially perpendicular to the connecting portion; the at least one latching protrusion protrudes from at least one of the two latching walls.

16. The portable electronic device of claim 15, wherein the latching portion is received in the accommodating space with the connecting portion abutting the board portion and the two latching walls abutting the two side walls.

17. A housing for components of a portable electronic device comprising:
a first portion; and
a second portion;
wherein, the first portion is coupled to the second portion to cooperatively define an accommodating space to house the components of the portable electronic device; and
wherein, the first portion is substantially composed of metal and the second portion is substantially composed of dielectric ceramic material;
wherein the first portion comprises an end surface of an end coupled to the second portion; the second portion comprises a main portion and a latching portion extending from the main portion; a step portion is formed at an end of the main portion connected to the latching portion, thereby forming a stepped exterior periphery of the second portion; the end surface resists and is aligned with the step portion for allowing a first outer surface of the main portion to be flush with a second outer surface of the second portion.

18. The housing of claim 17, further comprising:
an antenna connectable to at least one of the components of the portable electronic device;
wherein, the second portion has an inner surface facing the accommodating space and an outer surface opposite to the inner surface; and
wherein, the antenna is coupled to the inner surface of the second portion.

* * * * *